United States Patent
Radcliffe et al.

(10) Patent No.: US 7,925,902 B1
(45) Date of Patent: Apr. 12, 2011

(54) SYSTEM AND METHOD FOR CONTROLLING AN INTEGRATED DISPLAY COMPUTER HEAT SINK TEMPERATURE

(75) Inventors: William Scott Radcliffe, Columbus, OH (US); Michael A. Curran, Westerville, OH (US)

(73) Assignee: Micro Industries Corporation, Westerville, OH (US)

( * ) Notice: Subject to any disclaimer, the term of this patent is extended or adjusted under 35 U.S.C. 154(b) by 991 days.

(21) Appl. No.: 11/753,629

(22) Filed: May 25, 2007

Related U.S. Application Data

(63) Continuation-in-part of application No. 11/131,052, filed on May 17, 2005, now Pat. No. 7,397,659, which is a continuation-in-part of application No. 10/937,976, filed on Sep. 10, 2004, now Pat. No. 7,072,179.

(51) Int. Cl.
 *G06F 1/20* (2006.01)
 *G01K 13/00* (2006.01)

(52) U.S. Cl. ........ 713/300; 713/323; 702/130; 702/132; 702/136

(58) Field of Classification Search .......... 702/130, 702/132, 136; 374/10, 100; 713/300, 310, 713/320–324, 330, 340
See application file for complete search history.

(56) References Cited

U.S. PATENT DOCUMENTS

| | | | |
|---|---|---|---|
| 4,771,365 A | 9/1988 | Cichocki et al. | |
| 5,683,070 A | 11/1997 | Seed | |
| 5,729,431 A | 3/1998 | Marwah et al. | |
| 5,742,690 A | 4/1998 | Edgar | |
| 5,761,071 A | 6/1998 | Bernstein et al. | |
| 5,769,374 A | 6/1998 | Martin et al. | |
| 5,781,708 A | 7/1998 | Austin et al. | |
| 5,826,267 A | 10/1998 | McMillan | |
| 6,042,007 A | 3/2000 | Nugent et al. | |
| 6,052,279 A | 4/2000 | Friend et al. | |
| 6,078,848 A | 6/2000 | Bernstein et al. | |
| 6,081,422 A | 6/2000 | Ganthier et al. | |
| 6,086,173 A | 7/2000 | Restell | |
| 6,181,554 B1 | 1/2001 | Cipolla et al. | |
| 6,241,149 B1 | 6/2001 | Baitz et al. | |
| 6,290,517 B1 | 9/2001 | Anderson | |

(Continued)

OTHER PUBLICATIONS

"Management Software for Interactive Terminals-Kiosks-Media Displays," Kudos—Products, Copyright 2004, 2 pages from website, http://www.kudosdigital.com/products, printed Mar. 15, 2005.

(Continued)

*Primary Examiner* — Thomas Lee
*Assistant Examiner* — Fahmida Rahman
(74) *Attorney, Agent, or Firm* — Standley Law Group LLP

(57) ABSTRACT

A temperature control system and method for a heat sink in an integrated display computer. Temperature sensing and throttling capabilities of ICs are used to prevent a passive heat sink from rising above a maximum temperature. An algorithm for controlling power usage of the ICs limits the maximum heat sink temperature. The maximum temperature is adjustable with an option in the BIOS. The heat sink temperature is controlled by throttling down the ICs when the temperature rises. An ACPI/OSPM passive cooling mechanism for the CPU defines a thermal feedback equation that operates once a thermal trip point is reached. The higher the actual temperature is above the trip point, the faster the CPU throttles down. Likewise, the CPU throttles up as the actual temperature drops below the trip point. The reported CPU temperature is adjusted higher or lower depending on how close the actual temperature is to the specified heat sink operating temperature.

15 Claims, 1 Drawing Sheet

U.S. PATENT DOCUMENTS

| | | | |
|---|---|---|---|
| 6,324,056 B1 | 11/2001 | Breier et al. | |
| 6,336,615 B1 | 1/2002 | Jeon | |
| 6,373,768 B2* | 4/2002 | Woo et al. | 365/211 |
| 6,393,374 B1* | 5/2002 | Rankin et al. | 702/132 |
| 6,442,018 B1 | 8/2002 | Dinkin | |
| 6,442,700 B1* | 8/2002 | Cooper | 713/320 |
| 6,502,076 B1 | 12/2002 | Smith | |
| 6,532,152 B1 | 3/2003 | White et al. | |
| 6,839,227 B1 | 1/2005 | Correa | |
| 7,072,179 B1 | 7/2006 | Curran et al. | |
| 7,689,846 B1* | 3/2010 | Athas | 713/322 |
| 2001/0034664 A1 | 10/2001 | Brunson | |
| 2003/0048256 A1 | 3/2003 | Salmon | |
| 2003/0115096 A1 | 6/2003 | Reynolds et al. | |
| 2004/0204899 A1* | 10/2004 | Gunther et al. | 702/132 |
| 2006/0052970 A1* | 3/2006 | Arabi et al. | 702/132 |
| 2006/0161375 A1* | 7/2006 | Duberstein et al. | 702/132 |
| 2006/0287913 A1 | 12/2006 | Baluja | |

OTHER PUBLICATIONS

TouchPoint Solutions, Inc.—Catapult Software, Catapult™, Copyright 2005, 2 pages from website, http://www.touchpointsolutions.com/site/technology/discover_catapult.html, printed Mar. 15, 2005.

"Microspaceo® -PC from Digital-Logic—the smallest and fanless computer for rough environmental conditions," Digital-Logic AG—Press Release, Nov. 2002, http://digitallogic.presseagentur.com/pr-infos/digitallogic/en/ PR11-02.htm. printed Apr. 22, 2004.

Lemon, Sumner, "Hush Debuts Fanless Pentium 4PC, Sleek-looking desktop keeps its cool quietly.," PC World, IDG News Service, Sep. 23, 2003, http://www.pcworld.com/resource/printable/article/9,aid,112608,00.asp, printed Apr. 22, 2004.

"Little PC's—Fanless," Stealth Computer Corporation, http://www.stealthcomputer.com/littlepc_fanless.htm, printed Apr. 22, 2004.

Copient Technologies, Copyright 2002, 1 page from website, http://web.archive.org/web/20030724224421/http://www.copienttech.com, printed Mar. 9, 2005.

Copient Technologies, Products and Services, Copyright 2002, 2 pages from website, http://web.archive.org/ web/20030806105437/www.copienttech.com/pro..., printed Mar. 9, 2005.

"Software for Interactive Terminals, Kiosks and Media Displays," Kudos, 12 page brochure, www.kudosdevelopment.com, date unknown.

* cited by examiner

SYSTEM AND METHOD FOR CONTROLLING AN INTEGRATED DISPLAY COMPUTER HEAT SINK TEMPERATURE

CROSS REFERENCES TO RELATED APPLICATIONS

This application is a continuation-in-part application under 37 CFR 1.53(b) of U.S. patent application Ser. No. 11/131,052, issued as U.S. Pat. No. 7,397,659, entitled Integrated Display Computer with Peripherals and filed May 17, 2005, which is incorporated herein by reference, which is a continuation-in-part application under 37 CFR 1.53(b) of application U.S. patent application Ser. No. 10/937,976, issued as U.S. Pat. No. 7,072,179, entitled Fanless Computer With Integrated Display and filed on Sep. 10, 2004, now U.S. Pat. No. 7,072,179, which is incorporated herein by reference.

FIELD OF THE INVENTION

The present invention relates generally to computers with integrated displays. The present invention is a system and method for controlling the temperature of a heat sink in a fanless computer with an integrated display.

BACKGROUND OF THE INVENTION

Fanless or passively cooled computers provide many benefits over computers that use fans for cooling including increased reliability and lower maintenance costs. Fanless computers never suffer from unreliability or damage due to fan failure. One such fanless computer with an integrated display is described in U.S. Pat. No. 7,072,179. The computer of the '179 patent uses a natural convection process that results in very light air inflow and almost completely eliminates internal dust build-up and failures that result from dust build-up. As a result, maintenance costs associated with protecting components from fan failures, repairing and replacing fans, and repairing and replacing components damaged by fan failures are eliminated. Because the computer is fanless, it is also silent. Therefore, it is suitable for many applications including use in hospitals, libraries, or any other location where the presence of noise and dust is a concern. Furthermore, it comprises an integrated display so it is very compact and suitable for use in locations where the availability of space is a concern.

The computer of the '179 patent comprises a unique heat sink that supports the entire enclosure and causes heat in the device to dissipate through vents. The motherboard assembly attaches directly to the heat sink to facilitate thermal transfer characteristics so that components are cooled without the need for a fan. The heat sink further serves as the entire supporting structure of the circuit board assembly and is designed and incorporated into the device so that any stress experienced by the heat sink is not transferred to the solder joints. The entire PCB assembly moves with the heat sink.

Although operation of the integrated display computer of the '179 patent is not compromised by fan failures, the ICs thermally attached to the heat sink can use enough power to raise the heat sink temperature beyond acceptable safety limits. Therefore, there is a need to control power usage of the ICs in the fanless computer to limit the maximum heat sink temperature. Some ICs have the ability to sense their temperature and adjust their power level to keep from overheating. However, the temperature is measured at the IC, which does not directly correlate to the resulting passive heat sink temperature when the ICs and heat sink are thermally coupled. Therefore, an additional algorithm is needed that uses the temperature sensing and throttling capabilities of the ICs to prevent the passive heat sink from rising above a maximum temperature.

SUMMARY OF THE INVENTION

The present invention is a temperature control system and method for a heat sink in an integrated display computer. It uses temperature sensing and throttling capabilities of ICs to prevent a passive heat sink from rising above a maximum temperature. It comprises an algorithm for controlling power usage of the ICs in such a way to limit the maximum heat sink temperature.

DESCRIPTION OF EXAMPLE EMBODIMENTS

Figure 1:
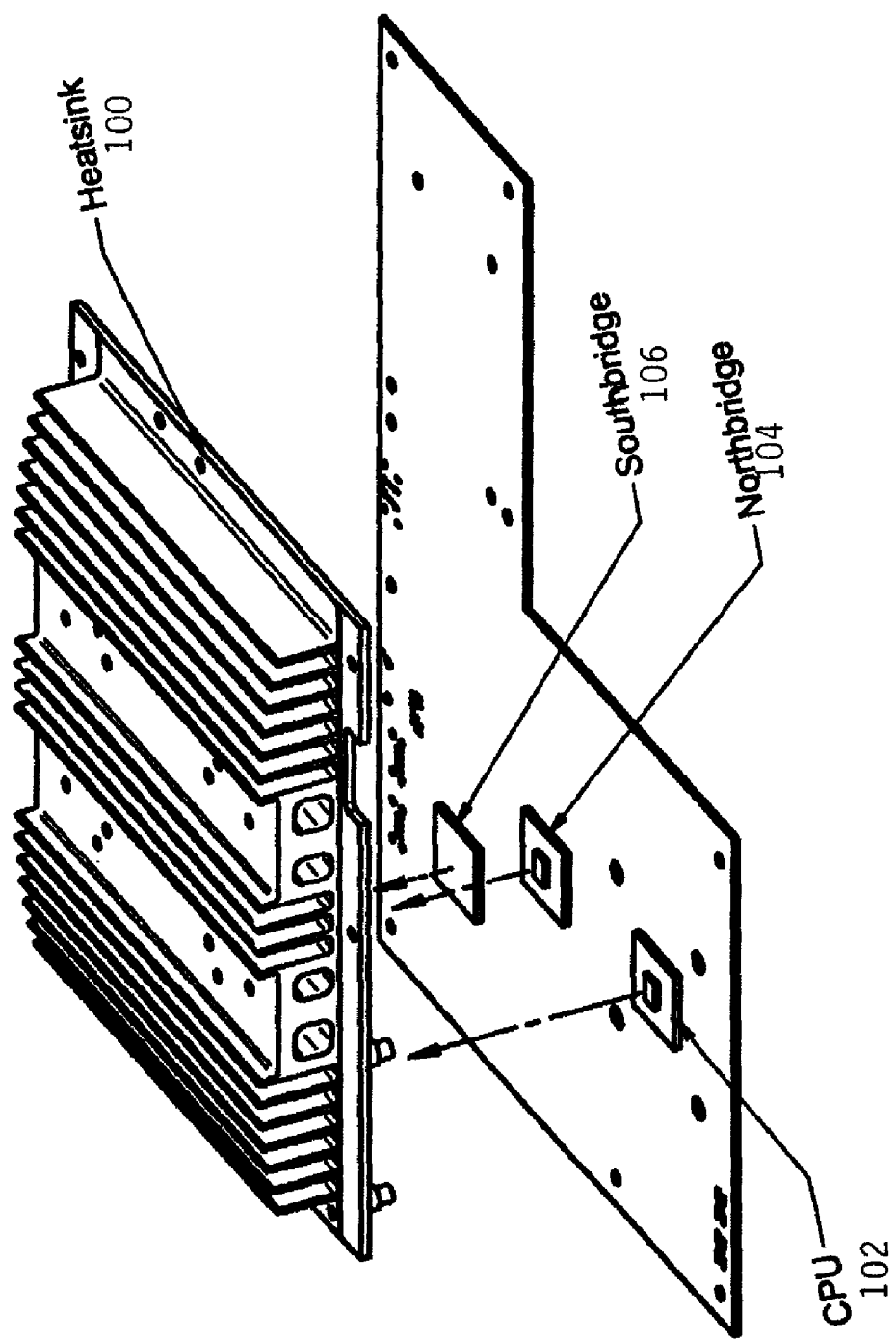
FIG. 1 is an assembly diagram for attaching a heat sink to CPU, northbridge, and southbridge integrated circuits.

Modern PC operating systems using ACPI (Advanced Configuration and Power Interface Specification) and OSPM (Operating System Power Management) software interfaces have the capability to throttle the CPU. In the present invention, this capability is extended with additional software logic to control the passive heat sink temperature in an integrated display computer. Referring to FIG. 1, an assembly diagram for attaching a heat sink to CPU, northbridge, and southbridge integrated circuits is shown. The heatsink 100 is designed to accommodate a CPU 102 and northbridge 104 and southbridge 106 integrated circuits. The CPU 102 and northbridge 104 are equipped with internal temperature sensors that trigger the software component of the present invention and provide throttling for the software component to adjust the IC power usage. An example of an IC with internal temperature sensors that may be used with an integrated display computer according to the present invention is the Intel® Core Duo microprocessor.

The maximum temperature of the integrated display computer is adjusted using a software component that executes on an IC with temperature sensing and throttling capabilities. In an example embodiment of the present invention, the heat sink maximum operating temperature is adjustable with an option in the BIOS Setup called "System Heatsink Max Temp." The option may be disabled or allow a user to specify a maximum operating temperature. In an example embodiment of the present invention, two operating temperatures in addition to the "disable" option are supported. The maximum temperature may be set to "[Disabled], [50 C], or [70 C]". When the "Disabled" option is selected, the unit does not perform any heat sink temperature control. If the [50 C] or [70 C] option is selected, the maximum temperature for the passive heat sink is controlled to the specified limit.

The heat sink temperature is controlled by throttling down the ICs when the temperature rises. It is desirable to throttle down the ICs only as much as needed because throttling slows system performance. An ACPI/OSPM passive cooling mechanism for the CPU defines a thermal feedback equation that operates once a thermal trip point is reached. The higher the actual temperature is above the trip point, the faster the CPU throttles down. Likewise, the CPU throttles up faster and faster as the actual temperature drops farther and farther below the trip point. In the present invention, the reported CPU temperature is adjusted higher or lower depending on how close the heat sink temperature is to the heat sink temperature limit.

Because the temperature is measured on the IC die, and not on the heat sink itself, a relationship between the two is established. There is a fairly constant thermal resistance between a particular IC die and the heat sink. The thermal resistance is determined by measuring the heat sink temperature and the IC die temperature at the highest power level of the IC, stated as Kelvin per Watt. Given this constant for both the CPU (Rcpu) and northbridge (Rnb), the heat sink temperature is calculated as follows based on the IC temperature and power usage:

TABLE 1

$$Ths\text{-}cpu = Tcpu - Rcpu * Pcpu$$
$$Ths\text{-}nb = Tnb - Rnb * Pnb$$

Because increasing power usage increases the temperature difference between the IC and heat sink, it is difficult to get an accurate measurement from the IC temperature. The northbridge has a much lower power usage than the CPU, so its temperature variation related to the heat sink is much lower. Therefore, the northbridge temperature provides a more accurate reading of the heat sink temperature. Assuming the lowest power usage for the above calculation, Pnb=Pnb(min), as worst-case where Ths-nb=Tnb.

Another important parameter is the maximum temperature difference of the heat sink between the CPU and northbridge:

TABLE 2

$$Ths\text{-}diff(max) = Ths\text{-}cpu(max) - Ths\text{-}nb(min)$$

This value can be determined experimentally (e.g., using thermocouples in the device) and is used to adjust the northbridge temperature reading. With this value, the worst case heat sink temperature can be stated as:

TABLE 3

$$Ths(worstcase) = Tnb + Ths\text{-}diff(max)$$

The goal is to keep Ths(worstcase)<Ths(max). Another equation indicates how close the temperature is to the heat sink temperature limit. If the temperature and limit are close, a larger adjustment is added to the CPU temperature to increase throttling.

TABLE 4

$$Ths(margin) = Ths(max) - Tnb - Ths\text{-}diff(max)$$

The temperature is increased as the margin decreases, and the temperature is decreased as the margin increases. The reported CPU temperature is adjusted according to the following equation:

TABLE 5

$$Tcpu\text{-}adj = TA1 * (TA2 - Ths(margin)) * Abs(TA2 - Ths(margin))$$

Appropriate values for constants TA1 and TA2 can be determined experimentally (e.g., using thermocouples in the device) to maintain maximum performance without surpassing the maximum heat sink temperature. The resulting Tcpu+Tcpu-adj value returned to OSPM is artificially bounded between 0 C and 100 C.

Preferably, the passive trip point is set close to (e.g., within two degrees of) the normal CPU temperature as the heat sink temperature limit is approached. The following equation provides a close estimate of this temperature:

TABLE 6

$$Tcpu(trip) = Ths(max) + Rcpu * Pcpu(typ) - Ths\text{-}diff(max)$$

With these adjustments to the established CPU passive cooling capabilities, it is possible to keep the passive heat sink temperature below the specified limit, independent of changing IC power usage or ambient temperature while minimizing the decrease in system performance.

Integrated display computers with passive heat sinks are appropriate for many applications. The present invention increases the dependability, reliability, and safety of such devices by monitoring and controlling the operating temperature. Temperature sensing and throttling capabilities of ICs are modified for use with the present invention to prevent a passive heat sink from rising above a maximum temperature. While example embodiments of the invention have been illustrated and described, various modifications and combinations can be made without departing from the spirit and scope of the invention. The number of supported temperatures may be increased and fall within the scope of the present invention. Modifications, combinations, and equivalents to the system and method of the present invention are intended to be covered and claimed.

What is claimed is:

1. A method for controlling temperature of a heat sink in an integrated display computer comprising:
    (a) installing in said integrated display computer at least one integrated circuit with internal temperature sensors and throttle control capabilities;
    (b) determining experimentally a maximum temperature limit for said heat sink;
    (c) determining experimentally at least one adjustment value to an actual temperature of said integrated circuit, wherein said adjustment value maintains maximum performance of said integrated circuit without exceeding said maximum temperature limit for said heat sink;
    (d) adding software logic to said integrated circuit to perform the following steps:
        (i) set a maximum operating temperature for said heat sink lower than said maximum temperature limit for said heat sink;
        (ii) set a trip point for said at least one integrated circuit below said maximum operating temperature for said heat sink;
        (iii) compare the actual temperature of said integrated circuit determined by an internal temperature sensor of said integrated circuit to said maximum operating temperature for said heat sink;
        (iv) return to an operating system power management component of said integrated circuit an adjusted temperature wherein said adjusted temperature a) is based on said actual temperature of said integrated circuit and said at least one adjustment value and b) causes said integrated circuit to increase or decrease throttling in relation to a difference between said adjusted temperature and said trip point; and
        (v) repeat steps (iii) and (iv) such that said actual temperature of said integrated circuit determined by said internal temperature sensor remains below said maximum operating temperature for said heat sink.

2. The method of claim 1 wherein determining experimentally said maximum temperature limit for said heat sink comprises measuring the actual temperature for said heat sink and said integrated circuit die at a highest power level of said integrated circuit.

3. The method of claim 1 wherein said trip point is set to within two degrees of a normal operating temperature for said integrated circuit.

4. The method of claim 1 wherein said at least one integrated circuit comprises a CPU.

5. The method of claim 1 wherein said at least one integrated circuit is selected from the group consisting of a northbridge and a southbridge.

6. The method of claim 1 wherein the step of setting a maximum operating temperature comprises accepting input for the maximum operating temperature.

7. A method for controlling temperature of a heat sink in an integrated display computer comprising:
  (a) installing in said integrated display computer a first integrated circuit with internal temperature sensors and throttle control capabilities and a second integrated circuit with internal temperature sensors and throttle control capabilities, wherein said second integrated circuit has a lower power usage than said first integrated circuit;
  (b) determining experimentally a maximum temperature limit for said heat sink;
  (c) determining experimentally a maximum temperature difference between said first integrated circuit and said second integrated circuit;
  (d) adding software logic to said first integrated circuit to perform the following steps:
    (i) set a maximum operating temperature for said heat sink lower than said maximum temperature limit for said heat sink;
    (ii) set a trip point for said first integrated circuit below said maximum operating temperature for said heat sink;
    (iii) calculate a temperature margin by subtracting from said maximum temperature limit for said heat sink an actual temperature of said second integrated circuit determined by an internal temperature sensor of said second integrated circuit and said maximum temperature difference between said first integrated circuit and said second integrated circuit;
    (iv) return to an operating system power management component of said first integrated circuit an adjusted temperature wherein said adjusted temperature is increased as said temperature margin decreases and said adjusted temperature is decreased as said temperature margin increases; and
    (v) repeating steps (iii) and (iv) such that said actual temperature of said first integrated circuit determined by an internal temperature sensor of said first integrated circuit remains below said maximum operating temperature for said heat sink.

8. The method of claim 7 wherein determining experimentally said maximum temperature limit for said heat sink comprises measuring an actual temperature for said heat sink and said first and second integrated circuit dies at a highest power level of said first integrated circuit.

9. The method of claim 7 wherein said trip point is set to within two degrees of a normal operating temperature for said first integrated circuit.

10. The method of claim 7 wherein said first integrated circuit comprises a CPU and said second integrated circuit is a northbridge.

11. The method of claim 7 wherein the step of setting the maximum operating temperature comprises accepting input for the maximum operating temperature.

12. A system for controlling temperature of a heat sink in an integrated display computer comprising:
  at least one integrated circuit with internal temperature sensors and throttle control capabilities installed in said integrated display computer, said integrated circuit comprising software logic to perform the following steps;
    (i) accept data for a maximum operating temperature for said heat sink;
    (ii) accept data for a trip point for said at least one integrated circuit below said maximum operating temperature for said heat sink;
    (iii) compare an actual temperature of said integrated circuit determined by an internal temperature sensor of said integrated circuit to said maximum operating temperature for said heat sink;
    (iv) return to an operating system power management component of said integrated circuit an adjusted temperature wherein said adjusted temperature a) is based on said actual temperature of said integrated circuit and at least one adjustment value, b) causes said integrated circuit to increase throttling as a difference between said adjusted temperature and said trip point decreases, and c) causes said integrated circuit to decrease throttling as a difference between said adjusted temperature and said trip point increases; and
    (v) repeat steps (iii) and (iv) such that said actual temperature of said integrated circuit determined by said internal temperature sensor remains below said maximum operating temperature for said heat sink.

13. The system of claim 12 wherein said maximum operating temperature is set below a maximum temperature limit for said heat sink determined experimentally by measuring an actual temperature for said heat sink and said integrated circuit die at a highest power level of said integrated circuit.

14. The system of claim 12 wherein said trip point is set to within two degrees of a normal operating temperature for said integrated circuit.

15. The system of claim 12 wherein accepting data for a maximum operating temperature comprises accepting user input for a maximum operating temperature.

* * * * *

UNITED STATES PATENT AND TRADEMARK OFFICE
CERTIFICATE OF CORRECTION

| | | |
|---|---|---|
| PATENT NO. | : 7,925,902 B1 | Page 1 of 1 |
| APPLICATION NO. | : 11/753629 | |
| DATED | : April 12, 2011 | |
| INVENTOR(S) | : William Scott Radcliffe and Michael A. Curran | |

It is certified that error appears in the above-identified patent and that said Letters Patent is hereby corrected as shown below:

On Page 2, Column 2, line 2, please delete ""Microspaceo®" and insert -- "Microspace® --

In Column 5, line 16, please delete "a" and insert -- the --

Signed and Sealed this
Twenty-first Day of June, 2011

David J. Kappos
*Director of the United States Patent and Trademark Office*